US012650853B2

(12) United States Patent
Debnath et al.

(10) Patent No.: US 12,650,853 B2
(45) Date of Patent: Jun. 9, 2026

(54) PROCESSOR-BASED SYSTEM INCLUDING A PROCESSING UNIT FOR DYNAMICALLY RECONFIGURING MICRO-ARCHITECTURAL FEATURES OF THE PROCESSING UNIT IN RESPONSE TO WORKLOAD BEING PROCESSED ON THE PROCESSING UNIT

(71) Applicant: QUALCOMM Incorporated, San Diego, CA (US)

(72) Inventors: Monobrata Debnath, San Diego, CA (US); Ajaykumar Shankargouda Patil, San Diego, CA (US); Anantha Ramaiah Idapalapati, San Diego, CA (US); Shankarganesh Kandasamy, Bangalore (IN); Azzedine Adam Touzni, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 18/533,734

(22) Filed: Dec. 8, 2023

(65) Prior Publication Data

US 2025/0190225 A1     Jun. 12, 2025

(51) Int. Cl.
*G06F 9/44* (2018.01)
*G06F 9/445* (2018.01)
(52) U.S. Cl.
CPC ............................... *G06F 9/44505* (2013.01)
(58) Field of Classification Search
CPC .................................... G06F 1/32; G06F 9/44
See application file for complete search history.

(56) References Cited

U.S. PATENT DOCUMENTS

2011/0283124 A1* 11/2011 Branover .............. G06F 1/3275
                                                            713/323
2016/0062768 A1    3/2016 Jagannathan et al.
(Continued)

OTHER PUBLICATIONS

Taneja, M., "Arm Neoverse N2 Platform: Industry-leading performance and power efficiency for Cloud-to-Edge infrastructure," Arm Community blogs—Architectures and Processors blog, Apr. 27, 2021, available from the Internet: [URL: https://community.arm.com/arm-community-blogs/b/architectures-and-processors-blog/posts/arm-neoverse-n2-industry-leading-performance-efficiency], 11 pages.

(Continued)

*Primary Examiner* — Keshab R Pandey
(74) *Attorney, Agent, or Firm* — W&T

(57) ABSTRACT

Aspects disclosed in the detailed description include a processing unit for dynamically reconfiguring micro-architectural features of the processing unit in response to a workload being processed on the processing unit and a processing unit control unit configured to receive a plurality of signals from the processing unit. The plurality of signals are indicia of the workload being processed on the processing unit. In response, the processing unit control unit determines whether performance, power consumption, or both, of the processing unit may be improved by modifying a micro-architectural feature. In response to determining that performance or power consumption of the processing unit may be improved by modifying micro-architectural features, the processing unit control unit triggers the processing unit to modify one or more of its micro-architectural features. The processing unit, in response to being triggered by the processing unit control unit, modifies one or more of its micro-architectural features.

17 Claims, 7 Drawing Sheets

(56)          References Cited

U.S. PATENT DOCUMENTS

| | | | | |
|---|---|---|---|---|
| 2017/0300418 | A1 | 10/2017 | Reed et al. | |
| 2021/0382393 | A1* | 12/2021 | Hansen | G06F 30/398 |
| 2022/0269943 | A1* | 8/2022 | Szatmary | G06N 5/04 |
| 2023/0195199 | A1 | 6/2023 | Chidambaram et al. | |
| 2024/0184344 | A1* | 6/2024 | Mclellan | G06F 1/266 |

OTHER PUBLICATIONS

International Search Report and Written Opinion for International Patent Application No. PCT/US2024/055457, mailed Mar. 4, 2025, 16 pages.

* cited by examiner

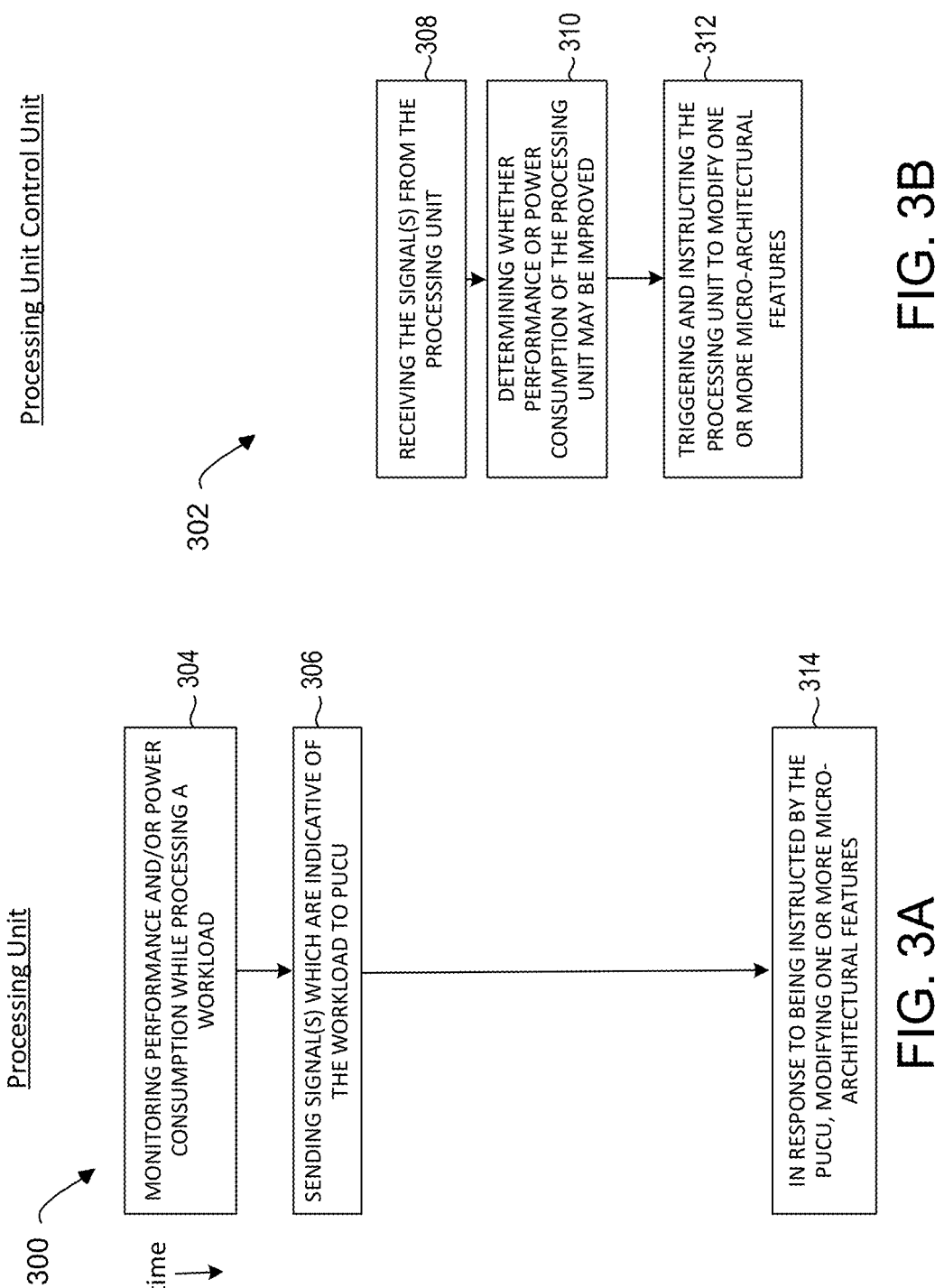

Processing Unit Control Unit

302

308 — RECEIVING THE SIGNAL(S) FROM THE PROCESSING UNIT

310 — DETERMINING WHETHER PERFORMANCE OR POWER CONSUMPTION OF THE PROCESSING UNIT MAY BE IMPROVED

312 — TRIGGERING AND INSTRUCTING THE PROCESSING UNIT TO MODIFY ONE OR MORE MICRO-ARCHITECTURAL FEATURES

FIG. 3B

Processing Unit

300 time →

304 — MONITORING PERFORMANCE AND/OR POWER CONSUMPTION WHILE PROCESSING A WORKLOAD

306 — SENDING SIGNAL(S) WHICH ARE INDICATIVE OF THE WORKLOAD TO PUCU

314 — IN RESPONSE TO BEING INSTRUCTED BY THE PUCU, MODIFYING ONE OR MORE MICRO-ARCHITECTURAL FEATURES

FIG. 3A

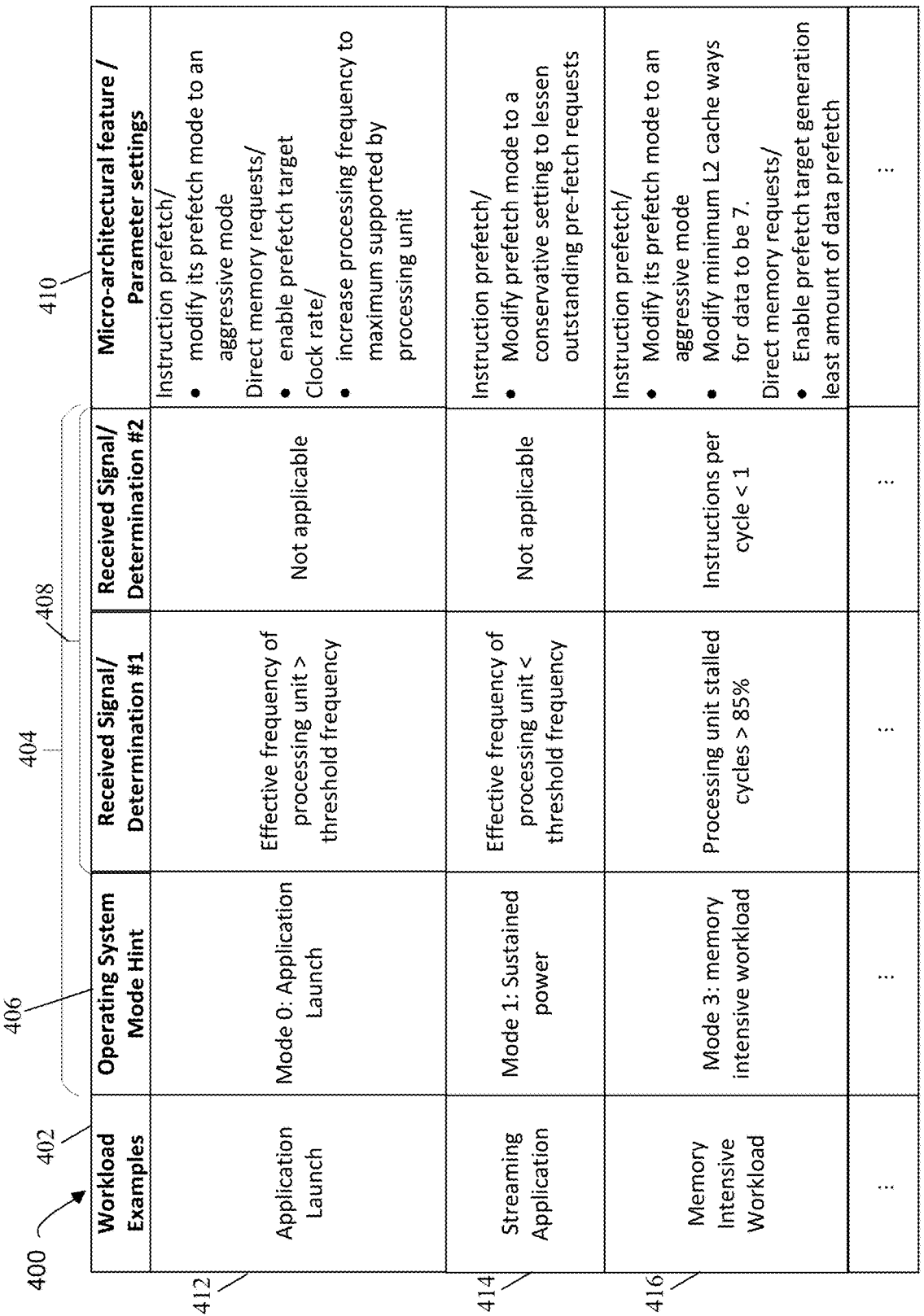

| Workload Examples | Operating System Mode Hint | Received Signal/ Determination #1 | Received Signal/ Determination #2 | Micro-architectural feature / Parameter settings |
|---|---|---|---|---|
| Application Launch | Mode 0: Application Launch | Effective frequency of processing unit > threshold frequency | Not applicable | Instruction prefetch/ • modify its prefetch mode to an aggressive mode Direct memory requests/ • enable prefetch target Clock rate/ • increase processing frequency to maximum supported by processing unit |
| Streaming Application | Mode 1: Sustained power | Effective frequency of processing unit < threshold frequency | Not applicable | Instruction prefetch/ • Modify prefetch mode to a conservative setting to lessen outstanding pre-fetch requests |
| Memory Intensive Workload | Mode 3: memory intensive workload | Processing unit stalled cycles > 85% | Instructions per cycle < 1 | Instruction prefetch/ • Modify its prefetch mode to an aggressive mode • Modify minimum L2 cache ways for data to be 7. Direct memory requests/ • Enable prefetch target generation least amount of data prefetch |
| ... | ... | ... | ... | ... |

PROCESSOR-BASED SYSTEM INCLUDING A PROCESSING UNIT FOR DYNAMICALLY RECONFIGURING MICRO-ARCHITECTURAL FEATURES OF THE PROCESSING UNIT IN RESPONSE TO WORKLOAD BEING PROCESSED ON THE PROCESSING UNIT

BACKGROUND

I. Field of the Disclosure

The field of the disclosure relates to reconfiguring micro-architectural features in a processor-based system (e.g., a graphics processing unit (GPU)-based system, a central processing unit (CPU)-based system).

II. Background

Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU or as a discrete hardware element that is separate from the CPU. A PU(s) executes software instructions that instruct a processor to fetch data from a location in memory and to perform one or more processor operations using the fetched data. The result may then be stored in memory. For example, this memory can be a cache memory local to the PU, a shared local cache among PUs in a PU block, a shared cache among multiple PU blocks, and/or a system memory in a processor-based system.

Cache memory, which can also be referred to as just "cache," is a smaller, faster memory that stores copies of data stored at frequently accessed memory addresses in a main memory or higher-level cache memory to reduce memory access latency. Thus, a cache memory can be used by a PU to reduce memory access times.

The manner in which data are fetched is an example of a micro-architectural feature and is made by a designer at design time. For example, data may be predictively fetched, also known as pre-fetched. Predictive fetching has many design time tunable aspects that are dependent on projected workload to be executed on the processing unit. For example, the cache memory may be an N-way cache where N-X ways are used for data while X-ways are used for meta data for tracking the pre-fetched data in cache. If the workload would benefit from a large amount pre-fetched data, the more X-ways are needed for tracking pre-fetch data in the cache. However, the more X-ways will reduce the amount of space in the cache for data. Conversely, if the workload would benefit from less pre-fetched data, less X-ways are needed and more space is available for data in the cache.

Another example of a micro-architectural feature includes the manner in which data is retrieved from a hierarchical memory system. When data requested by a memory read request is present in a cache memory (i.e., a cache "hit"), system performance may be improved by retrieving the data from the cache instead of slower access system memory. Conversely, if the requested data is not found in the cache (resulting in a cache "miss"), the requested data then must be read from a higher-level cache memory or a system memory. Frequent occurrences of cache misses result in system performance degradation that could negate the advantage of using the cache in the first place. The cache hit rate of cache memory can generally be improved by increasing the size of a cache memory because an increased size cache memory can store more cache lines, thus increasing the likelihood of a cache hit. However, increasing the size of cache memory comes at an increased cost in terms of increased area and power consumption.

SUMMARY

Aspects disclosed in the detailed description include a processor-based system including a processing unit for dynamically reconfiguring micro-architectural features of the processing unit in response to a workload being processed on the processing unit. The processor-based system also includes a processing unit control unit configured to receive a plurality of signals from the processing unit. The plurality of signals are indicia of the workload being processed on the processing unit. In response to at least one of the plurality of signals, the processing unit control unit determines whether performance, power consumption, or both, of the first processing unit may be improved by modifying a micro-architectural feature. In response to determining that performance or power consumption of the processing unit may be improved by modifying micro-architectural features, the processing unit control unit triggers the processing unit to modify one or more of its micro-architectural features. The processing unit, in response to being triggered by the processing unit control unit, modifies one or more of its micro-architectural features. In this regard, the processing unit advantageously modifies its micro-architectural features dynamically to better match the power consumption and/or performance requirements of the workload being processed on the processing unit.

In this regard in one aspect, A processor-based system for dynamically reconfiguring micro-architectural features, comprising a first processing unit, the first processing unit comprising one or more micro-architectural features and a processing unit control unit configured to: receive a plurality of signals from the first processing unit, wherein the plurality of signals are indicia of a workload being processed by the first processing unit. In response to at least one of the plurality of signals, the processing unit control unit is further configured to determine whether performance or power consumption of the first processing unit may be improved and, in response to determining that the performance or the power consumption of the first processing unit may be improved, the processing unit control unit is further configured to trigger the first processing unit to modify the one or more micro-architectural features. The first processing unit, in response to being triggered by the processing unit control unit, is configured to modify the one or more micro-architectural features.

In another aspect, a method for dynamically reconfiguring micro-architectural features, comprising receiving a plurality of signals from a first processing unit, wherein the plurality of signals are indicia of a workload being processed by the first processing unit, the first processing unit comprising one or more micro-architectural features. In response to at least one of the plurality of signals, the method further comprises determining whether performance or power consumption of the first processing unit may be improved. In response to determining that the performance or the power consumption of the first processing unit may be improved, the method further comprises triggering the first processing unit to modify the one or more micro-architectural features and modifying the one or more micro-architectural features in the first processing unit.

In another aspect, a processor-based system for dynamically reconfiguring micro-architectural features, comprising a means for receiving a plurality of signals from a first processing unit, wherein the plurality of signals are indicia of a workload being processed by the first processing unit, the first processing unit comprising one or more micro-architectural features. In response to at least one of the plurality of signals, the processor-based system further comprises a means for determining whether performance or power consumption of the first processing unit may be improved. In response to determining that the performance or the power consumption of the first processing unit may be improved, the processor-based system further comprises a means for triggering the first processing unit to modify the one or more micro-architectural features and a means for modifying the one or more micro-architectural features in the first processing unit.

BRIEF DESCRIPTION OF THE DRAWINGS

FIG. 3A is a flowchart illustrating an exemplary set of actions performed by a processing unit to dynamically reconfigure one or more of its micro-architectural features in response to a workload it is processing;

FIG. 3B is a flowchart illustrating an exemplary set of actions performed by a PUCU to determine whether to trigger the processing unit of FIG. 3A to dynamically reconfigure one or more micro-architectural features of the processing unit;

FIG. 4 is a table of three exemplary workload examples and illustrates how a PUCU, such as the PUCU of FIG. 3B, makes determinations for modifying one or more micro-architectural features of an exemplary processing unit, such as the one in FIG. 2;

DETAILED DESCRIPTION

Figure 1:
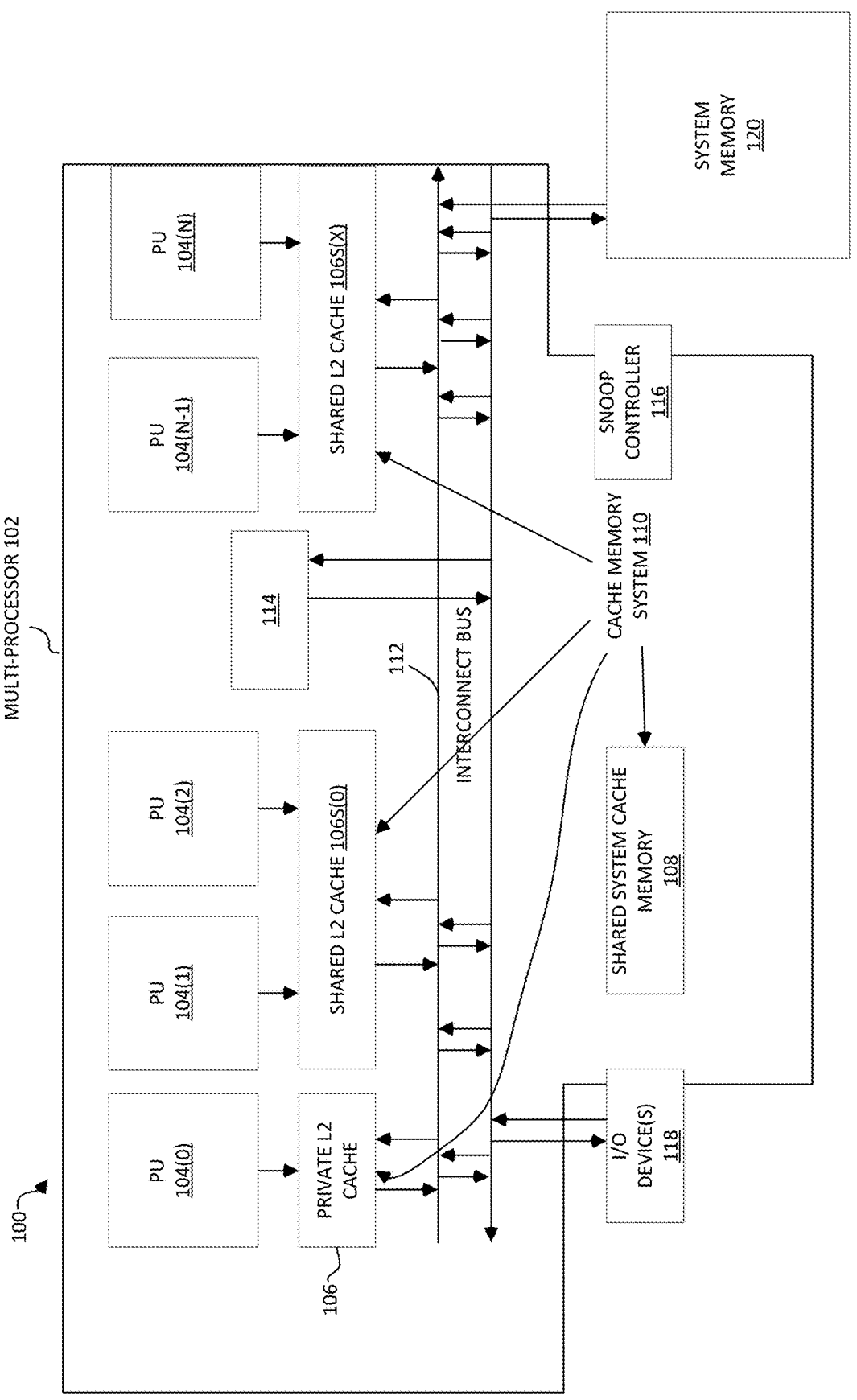
FIG. 1 is a block diagram of an exemplary processor-based system that includes multiple processing units (PUs) and a memory system that includes a cache memory system including a hierarchy of local and shared cache memories and a system memory, and wherein the processor-based system includes a processing unit control unit (PUCU) to dynamically reconfigure micro-architectural features of one or more of the multiple PUs in response to a workload being processed on a respective processing unit.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a processor-based system including a processing unit for dynamically reconfiguring micro-architectural features of the processing unit in response to a workload being processed on the processing unit. The processor-based system also includes a processing unit control unit configured to receive a plurality of signals from the processing unit. The plurality of signals are indicia of the workload being processed on the processing unit. In response to at least one of the plurality of signals, the processing unit control unit determines whether performance, power consumption, or both, of the first processing unit may be improved by modifying a micro-architectural feature. In response to determining that performance or power consumption of the processing unit may be improved by modifying micro-architectural features, the processing unit control unit triggers the processing unit to modify one or more of its micro-architectural features. The processing unit, in response to being triggered by the processing unit control unit, modifies one or more of its micro-architectural features. In this regard, the processing unit advantageously modifies its micro-architectural features dynamically to better match the power consumption and/or performance requirements of the workload being processed on the processing unit.

In this regard, FIG. 1 is a block diagram of an exemplary processor-based system that includes multiple processing units (PUs) and a memory system that includes a cache memory system including a hierarchy of local and shared cache memories and a system memory, and wherein the processor-based system includes a processing unit control unit (PUCU) to dynamically reconfigure micro-architectural features of one or more of the multiple PUs in response to workload being processed on a respective processing unit. Before discussing these aspects, other exemplary aspects of the processor-based system 100 are first described below.

The processor-based system 100 includes a multiple (multi-) processing unit (PU) (multi-PU) processor 102, or also known as a multi-processor, that includes multiple Pus 104(0)-104(N) and a hierarchical memory system. The multiple PUs 104(0)-104(N) have their own pipelines. A more detailed discussion of a pipeline will be discussed in connection with FIG. 2. At least one or more of the multiple PUs 104(0)-104(N) includes configurable micro-architectural features. A micro-architectural feature refers to a feature in a PU that addresses the manner in which the PU fetches or prefetches data including instructions into its pipeline. The operation of a micro-architectural feature can be controlled by one or more parameters where each parameter may be set to a value within a spectrum of settings. The spectrum of settings may range from a most conservative setting to a most aggressive setting. A most aggressive setting highly favors either power consumption over performance of the PU or performance over power consumption of the PU. A conservative setting does not favor power consumption or performance over the other.

As part of the hierarchical memory system, for example, PU 104(0) includes a private local cache memory 106, which may be a Level 2 (L2) cache memory. Pus 104(1), 104(2) and Pus 104(N-1), 104(N) are configured to interface with respective local shared cache memories 106S(0)-106S (X), which may also be L2 cache memories for example. If a data read request requested by a PU 104(0)-104(N) results in a cache miss to the respective cache memories 106, 106S(0)-106S(X), the read request may be communicated to a next-level cache memory, which in this example is a shared system cache memory 108. For example, the shared system cache memory 108 may be a Level 3 (L3) cache memory, also referred to as a last level cache. The cache memory 106, the local shared cache memories 106S(0)-106S(X), and the shared system cache memory 108 are part of a hierarchical cache memory system 110. The hierarchical cache memory system 110 may include both instructions and data. An interconnect bus 112, which may be a coherent bus, is provided that allows each of the Pus 104(0)-104(N) to access the local shared cache memories 106S(0)-106S(X) (if shared to the PU 104(0)-104(N)), the shared system cache memory 108, and other shared resources coupled to the interconnect bus 112.

The processor-based system 100 in FIG. 1 includes a processing unit control unit (PUCU) 114 that is a processing unit and is configured to dynamically reconfigure micro-architectural features of one or more of the multiple PUs 104(0)-104(N) in response to a workload being processed on a respective one of the PUs. The PUCU 114 is configured to receive a plurality of signals from the PUs 104(0)-104(N) over the interconnect bus 112. The plurality of signals are indicia of a workload being processed by the PUs 104(0)-104(N). In response to at least one of the plurality of signals from one of the PUs 104(0)-104(N), such as PU 104(0) for example, the PUCU 114 is configured to determine whether performance or power consumption of the PU 104(0) may be improved. In response to determining that performance or power consumption of the PU 104(0) may be improved, the PUCU 114 is also configured to trigger the PU 104(0) to modify one or more of its micro-architectural features. The PU 104(0), in response to being triggered by the PUCU 114, is configured to modify one or more micro-architectural features. For example, the PUCU 114 may trigger the PU 104(0) to modify micro-architectural features to lower power consumption of the PU 104(0) for the workload being processed by the PU 104(0). In another example, the PUCU 114 may trigger the PU 104(0) to modify micro-architectural features to increase performance, such as reducing latency, of the workload being processed by the PU 104(0). Providing a PUCU that enables a processing unit to dynamically reconfigure its own micro-architectural features advantageously provides for the processing unit to improve either power consumption or performance depending on the current workload being processed by the processing unit. More details of a processing unit, such as the PU 104(0) will be discussed in connection with FIG. 2. The PUCU 114 will be discussed further in connection with FIG. 3.

With continuing reference to FIG. 1, the processor-based system 100 in this example also includes a snoop controller 116, which is also coupled to the interconnect bus 112. The snoop controller 116 is a circuit that monitors or snoops cache memory bus transactions on the interconnect bus 112 to maintain cache coherency among the cache memories 106, 106S(0)-106S(X), 108 in the cache memory system

110. Other shared resources that can be accessed by the PUs 104(0)-104(N) through the interconnect bus 112 can include input/output (I/O) devices 118 and a system memory 120 (e.g., a dynamic random access memory (DRAM)). If a cache miss occurs for a read request issued by a PU 104(0)-104(N) in each level of the cache memories 106, 106S(0)-106S(X), 108 accessible for the PU 104(0)-104(N), the read request is serviced by the system memory 120, and the data associated with the read request is installed in the cache memories 106, 106S(0)-106S(X), 108 associated with the requesting PU 104(0)-104(N). An example of a micro-architecture includes by-passing the cache memory system 110 on a read request such that the read request is sent from a PU, such as PU 104(1), directly to the system memory 120. The PUCU 114 may determine based on the workload being processed by the PU 104(1) that performance, such as latency delay read requests may be improved by by-passing the cache memory system 110 and directing read requests to the system memory 120. Examples of the plurality of signals that are received by the PUCU 114 and other examples of modifying micro-architectural features will be discussed in connection with FIG. 5.

Figure 2:
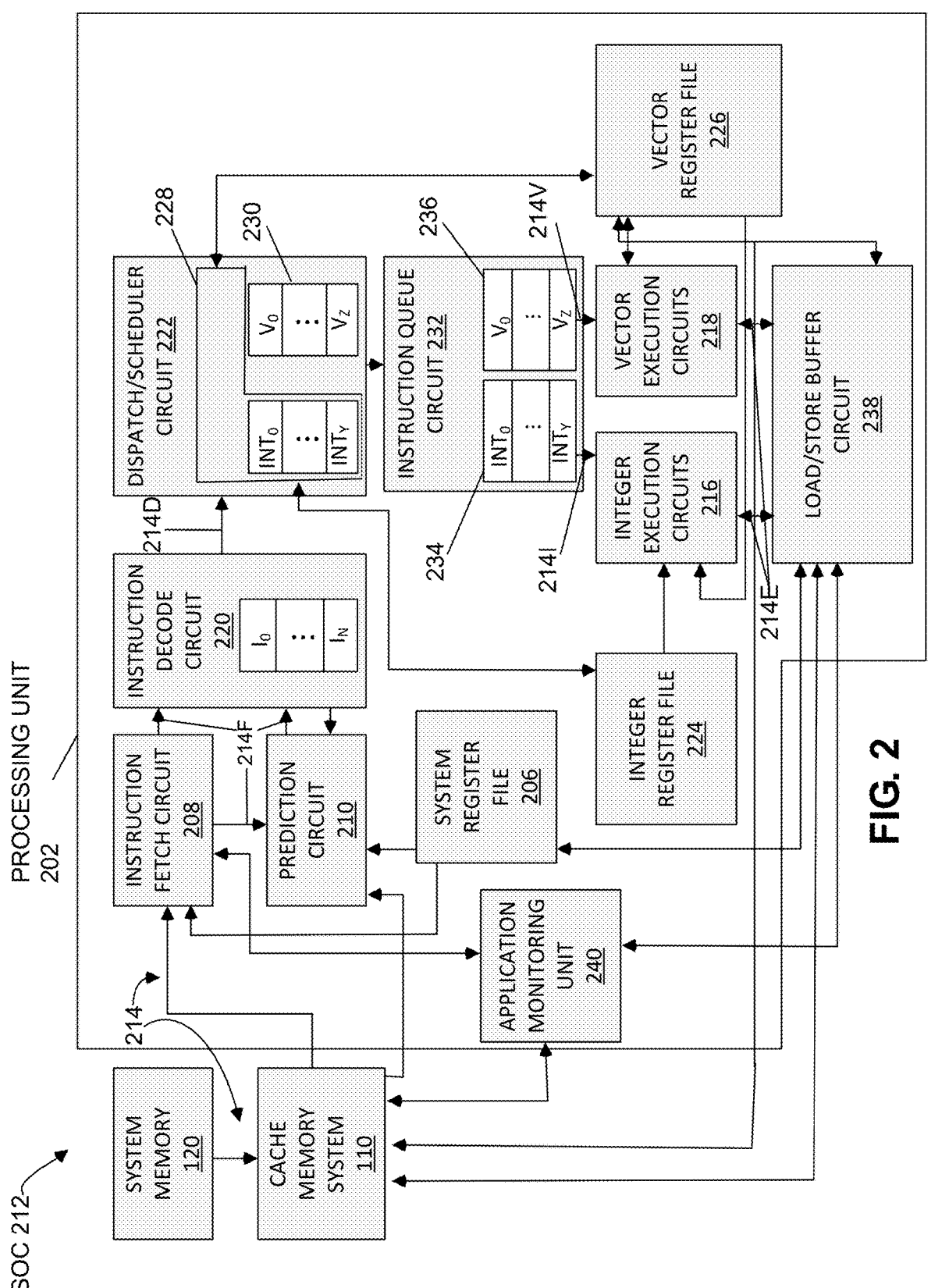
FIG. 2 is a block diagram of an exemplary processing unit in the processor-based system of FIG. 1, the exemplary processing unit dynamically reconfigures its micro-architectural features in response to being triggered by the PUCU.

FIG. 2 is a block diagram of an exemplary processing unit 202 in the processor-based system of FIG. 1, such as the PUs 104(0)-104(N), which dynamically reconfigures its micro-architectural features in response to being triggered by the PUCU 114. Before describing the detailed operation of the processing unit 202 below, the PUCU 114, in short, triggers the processing unit 202 to modify micro-architectural features and does so by posting an interrupt to the cache memory system 110. The processing unit 202 interrupts its processing to retrieve interrupt handler instructions from the cache memory system 110 or the system memory 120. The processing unit 202, as will be described further below, will process the interrupt handler instructions to set the micro-architectural feature settings in a system register file 206 which, in turn, are read from an instruction fetch circuit 208 and/or a prediction circuit 210 to modify the manner in which these circuits fetch memory addresses and predict memory addresses for fetching.

Returning to the detailed operation of the processing unit 202, the processing unit 202 may be provided in a system-on-a-chip (SoC) 212 as an example. In this regard, instructions 214, including integer and vector instructions, are fetched by the instruction fetch circuit 208 from the cache memory system 110. The instruction fetch circuit 208 is configured to provide the instructions 214 as fetched instructions 214F into one or more instruction pipelines $I_0$-$I_N$ in the processing unit 202 to be pre-processed, before the fetched instructions 214F reach an execution circuit, such as integer execution circuits 216 and vector execution circuits 218 in the processing unit 202, to be executed. The instruction pipelines $I_0$-$I_N$ are provided across different processing circuits or stages of the processing unit 202 to pre-process and process the fetched instructions 214F in a series of steps that are performed concurrently to increase throughput prior to execution of the fetched instructions 214F in the integer execution circuits 216 and the vector execution circuits 218.

With continuing reference to FIG. 2, the prediction circuit 210 (e.g., a branch prediction circuit, a memory stride prediction circuit, and the like) is also provided to speculate or predict a target address for a control flow fetched instruction 214F, such as a conditional branch instruction. The prediction of the target address by the prediction circuit 210 is used by the instruction fetch circuit 208 to determine the next fetched instructions 214F to fetch based on the predicted target address. An instruction decode circuit 220 is configured to decode the fetched instructions 214F fetched by the instruction fetch circuit 208 into decoded instructions 214D to determine the type of instructions 214 and actions required, which in turn is used to determine in which instruction pipeline $I_0$-$I_N$ the fetched instructions 214F should be placed.

With continuing reference to FIG. 2, in this example, the decoded instructions 214D are then placed in one or more of the instruction pipelines $I_0$-$I_N$ and are next provided to a dispatch and scheduler circuit 222. The dispatch and scheduler circuit 222 is configured to divide the decoded instructions 214D into an integer instruction pipeline including integer instructions $INT_o$-$INT_y$ and a vector instruction pipeline including vector instructions $V_o$-$V_z$. The dispatch and scheduler circuit 222 determines if any register names in the decoded instructions 214D need to be renamed to break any register dependencies that would prevent parallel or out-of-order processing of the instructions 214. The processing unit 202 in FIG. 2 can process the fetched instructions 214F out of order, if possible, to achieve greater throughput performance and parallelism.

The dispatch and scheduler circuit 222 is configured to call upon a register map table (RMT) (not shown) to rename a logical source register operand and/or write a destination register operand of an instruction 214 to available physical registers in a physical register file, such as an integer register file 224 or a vector register file 226. In particular, an integer instruction scheduler circuit 228 is configured to rename a logical source register operand and/or write a destination register operand of an integer instruction, such as the integer instructions $INT_o$-$INT_y$, in the integer register file 224. Also, a vector instruction scheduler circuit 230 is configured to rename a logical source register operand and/or write a destination register operand of a vector instruction, such as the vector instructions $V_o$-$V_z$, in the vector register file 226. In order for the integer instruction scheduler circuit 228 to track the renaming of registers, the integer instruction scheduler circuit 228 has access to a fixed amount of data space associated with scoreboarding techniques for tracking registers with their respective instructions.

It may be desired to provide for the processing unit 202 to have visibility to a large number of future instructions 214 (i.e., an instruction window) in order to extract a larger number of instructions 214 that can be executed independently, out of order for increased performance.

In this regard, the dispatch and scheduler circuit 222 is configured to provide the retrieved produced value from an executed instruction 214E as the source register operand of an instruction 214 to be executed. The dispatch and scheduler circuit 222 is configured to dispatch the decoded instruction 214D to an instruction queue circuit 232 to await dispatch to either the integer execution circuits 216 or the vector execution circuits 218 to be executed when all source register operands for the decoded instruction 214D are available. The instruction queue circuit 232 includes a queue buffer 234 which is configured to receive one or more integer instructions and a queue buffer 236 which is configured to receive one or more vector instructions. In order for the vector instruction scheduler circuit 230 to track the renaming of registers, the vector instruction scheduler circuit 230 has access to a fixed amount of data space associated with scoreboarding techniques for tracking registers with their respective instructions.

The integer execution circuits 216 execute one or more integer instructions 214I, such as the integer instructions $INT_o$-$INT_y$ from the integer instruction queue buffer 234 when the source register operands are available. Similarly, the vector execution circuits 218 execute one or more vector instructions 214V, such as the vector instructions $V_o$-$V_z$, from the vector instruction queue buffer 236 when the source register operands are available and execute the received vector instructions. A load/store buffer circuit 238 receives the results of the executed instructions 214E and writes back the results to memory including the cache memory system 110 and/or the system memory 120 for use by subsequent instructions. When the instruction 214I is a result of instructions from an interrupt handler triggered by an interrupt from the PUCU 114 to modify a micro-architectural feature of the processing unit 202, the load/store buffer circuit 238 sets parameters associated with the micro-architectural feature in the system register file 206. For example, the load/store buffer circuit 238 may set the ways of the cache memory system 110 to be used for data versus metadata, the number of maximum prefetch instructions to prefetch, the maximum distance in an address range to prefetch, and the like. When these parameters are set in the system register file 206, the instruction fetch circuit 208 and the prediction circuit 210 read parameter settings as applicable to adjust how they fetch instructions and predict instructions to fetch. If these parameter settings modify how data, as opposed to instructions, are fetched, the load/store buffer circuit 238 reads the applicable parameter settings from the system register file 206 to adjust how the load/store buffer circuit 238 loads data from the cache memory system 110 in response to executing an instruction 214E. The load/store buffer circuit 238 also tracks all addresses it generates for data (not instructions) retrieval during processing and prefetches data addresses based on pattern analysis. The data will be prefetched into different cache levels of the cache memory system 110 and consumed by the integer execution circuits 216, vector execution circuits 218, and load/store buffer circuit 238.

The processing unit 202 includes an application monitoring unit 240 which monitors various aspects of its performance and power consumption of the processing unit 202 while executing a series of instructions 214, also referred to as a workload, through its pipeline. These aspects include the number of pipeline stalls per clock cycle, the number of reads missed at various levels of hierarchy in the cache memory system 110, the number of instructions executed per cycle over a time period, and the like, and are indicative of the workload being processed by the processing unit 202. The application monitoring unit 240 sends these monitored aspects as signals/messages to the PUCU 114 either over the interconnect bus 112 or through the cache memory system 110.

The PUCU 114 includes the same circuits as described above in the exemplary processing unit 202. The PUCU 114 fetches instructions 214 from the cache memory 110 and the system memory 120. In this case, the instructions 214 include an algorithm to receive the signals/messages from the PUs 104(0)-104(N) which are indicative of the workloads being individually processed by PUs 104(0)-104(N) such as the signals sent by the application monitoring unit 240. The PUCU 114 determines, based on the signals/messages, whether performance or power consumption of any one or more of the PUs 104(0)-104(N) may be improved while processing the workload on the respective PU. If so, the PUCU 114 determines the settings of parameters that control the operation of one or more micro-architectural features of the respective PU which will improve performance, power consumption, or both. The PUCU 114 will then trigger the respective PU through an interrupt to modify its micro-architectural feature(s) by the settings of parameters determined by the PUCU 114. An exemplary set of workload examples including corresponding signals and parameter settings to dynamically configure one or more micro-architectural features will be discussed in connection with FIG. 4.

FIG. 3A is a flowchart of a process 300 illustrating an exemplary set of actions performed by a processing unit, such as the processing unit 202 of FIG. 2, to dynamically reconfigure one or more of its micro-architectural features in response to a workload it is processing. FIG. 3B is a flowchart of a process 302 illustrating an exemplary set of actions performed by a PUCU, such as the PUCU 114 of FIG. 1, to determine whether to trigger the processing unit of FIG. 3A to dynamically reconfigure one or more micro-architectural features of the processing unit. FIG. 3A and FIG. 3B will be discussed together to illustrate the cooperation between a processing unit 202 and the PUCU 114. In this regard, the processing unit 202 monitors its performance and power consumption while processing a workload (block 304, FIG. 3A). Processing unit 202 sends signals which are indicative of the workload to the PUCU 114 (block 306, FIG. 3A). The PUCU 114 receives the signals from the processing unit (block 308, FIG. 3B). The PUCU 114 determines whether performance or power consumption of the processing unit may be improved given the workload (block 310, FIG. 3B). The PUCU 114 triggers and instructs the processing unit how to modify one or more micro-architectural features (block 312, FIG. 3B). The processing unit 202, in response to being triggered by the PUCU 114, modifies one or more micro-architectural features (block 314, FIG. 3A).

FIG. 4 is a table 400 of three exemplary workload examples, column 402, and illustrates how a PUCU, such as the PUCU 114, makes determinations for modifying one or more micro-architectural features of an exemplary processing unit, such as the processing unit 202 in FIG. 2. The PUCU 114 receives a plurality of signals 404. The plurality of signals 404 may come from an operating system, such as Android, IOS, and the like as shown in column 406. The signals from the operating system in column 406 to the PUCU 114 provide an application characteristic of the workload running on the processing unit such as whether an application is being launched, whether an application has a sustained power workload, or whether an application has a memory intensive workload. The signals received from the processing unit 202, columns 408, include performance characteristics of the processing unit 202. They include, but are not limited to, the effective frequency of the processing unit, the number of processing unit stalled cycles, and instructions per cycle. Column 410 illustrates the micro-architecture feature to be reconfigured and the parameters to set for the dynamic reconfiguration by the processing unit 202.

The first example, row 412, indicates how the PUCU 114 determines whether to trigger and instruct the processing unit 202 to modify its instruction prefetch, direct memory requests, and processing frequency micro-architecture features. The PUCU 114 receives an application launch signal from the operating system as well as a signal indicating the effective frequency of the processing unit. An example of an application is a user application. The PUCU 114 determines if the effective frequency of the processing unit 202 is greater than a threshold frequency. For example, if the maximum frequency for the PU is 3000 MHz, the effective frequency is 900 MHz and the threshold frequency is 800 MHZ, the PUCU 114 determines that performance can be increased by instructing the processing unit 202 to reconfigure its prefetch and processor speed micro-architectural features. The PUCU 114 triggers and instructs the processing unit 202 to 1) set an aggressive prefetch mode, 2) enable a prefetch target (e.g., by-passing a memory request look-up in at least the shared system cache memory 108 of the shared system cache memory 108 on a miss in a lower level cache (e.g. L1 or L2 level cache) and immediately forward memory request to the system memory 120), and, optionally, 3) set the processing unit clock rate to a maximum supported frequency, 3000 MHz for this example. The PUCU 114 will set the processing unit clock rate if the workload is not system memory 120 intensive.

A prefetch mode specifies the number of outstanding data prefetches that can be deployed by the instruction fetch circuit 208. The higher the number of outstanding data prefetches, the more efficient the flow of data through the pipeline of processing unit 202 (i.e., less probability of memory stalls experienced). A high number of outstanding data prefetches is selected by the PUCU 114 when the memory locations for the data is more predictable. In this example, an aggressive prefetch mode is a high number of outstanding prefetch requests. Enabling a prefetch target means by-passing one or more levels of the cache memory system 110 on memory requests. A high level of memory stalls indicate that memory requests are being served by higher levels of the cache memory system 110 hierarchy or the system memory 120. In this example, enabling a prefetch target will send a speculative memory request directly to the system memory 120 without attempting to service the speculative memory request in the cache memory system 110. As a result, more processing unit cycles will be saved from not accessing the cache memory system 110 than the latency delay for retrieving data for the speculative memory request directly from the system memory 120. Returning to the third parameter setting of increasing the frequency to the maximum supported by the processing unit, the PUCU 114 determines that the effective frequency of the processing unit 202 is greater than a threshold frequency. For example, the effective frequency of the processing unit 202 may be 800 megahertz (MHz) while the threshold frequency is 600 MHz and the maximum clock frequency to drive the PU 202 is 2 gigahertz (GHz). In the first example, the PUCU 114 will also trigger the processing unit 202 to increase its clock frequency to 2 GHz.

The second example, row 414, indicates how the PUCU 114 determines whether to trigger and instruct the processing unit 202 to modify its instruction prefetch micro-architecture to reduce traffic to the system memory 120. The PUCU 114 receives a sustained power signal from the operating system as well as a signal indicating the effective frequency of the processing unit. A sustained power signal would indicate that a video streaming workload was running on the processing unit 202 such as YouTube or a video game. The PUCU 114 determines if the effective frequency of the processing unit 202 is less than a threshold frequency. If so, the PUCU 114 determines that memory latency can be reduced by instructing the processing unit 202 to reconfigure its prefetch mode to a conservative setting (i.e., less outstanding prefetch requests) so that more memory hits occur in the cache memory system 110. The PUCU 114 triggers and instructs the processing unit 202 to enable this conservative prefetching mode setting, such as, decrease the ways in the cache memory system 110 to be used by prediction circuit 210 and increase the ways in the cache memory system 110 to be used by the load/store buffer circuit 238.

The third example, row 416, indicates how the PUCU 114 determines whether to trigger and instruct the processing unit 202 to modify its instruction prefetch and memory request micro-architecture features. The PUCU 114 receives a signal from the operating system indicating that the workload running on the processing unit 202 is a memory intensive workload such as particular benchmarks used in analyzing the performance of processing units. The PUCU 114 also receives signals from the processing unit 202 that indicate the number of processing unit stalled cycles over a given time and the number of instructions processed by the processing unit 202 in a cycle. The PUCU 114 determines that the percentage of stalled cycles is greater than a threshold, e.g., 85%, and that the instructions processed per cycle is less than 1. Given this, the PUCU 114 determines that performance can be increased by instructing the processing unit 202 to reconfigure its instruction prefetch micro-architectural feature. The PUCU 114 triggers and instructs the processing unit 202 to 1) set its prefetch mode to an aggressive mode (i.e., increase the number of outstanding speculative prefetch requests, increase the prefetch distance (how far ahead of a demand access stream the prefetch requests are issued)), 2) set L2 cache ways to be reserved for data to be a maximum (e.g., in an 8-way L2 cache, use seven ways for data and one way for metadata which helps track the prefetched data), and 3) enable a prefetch target (e.g., by-passing up a memory request look-up in the shared system cache memory 108 on a miss in a lower level cache and immediately direct memory requests to the system memory 120).

Figure 5:
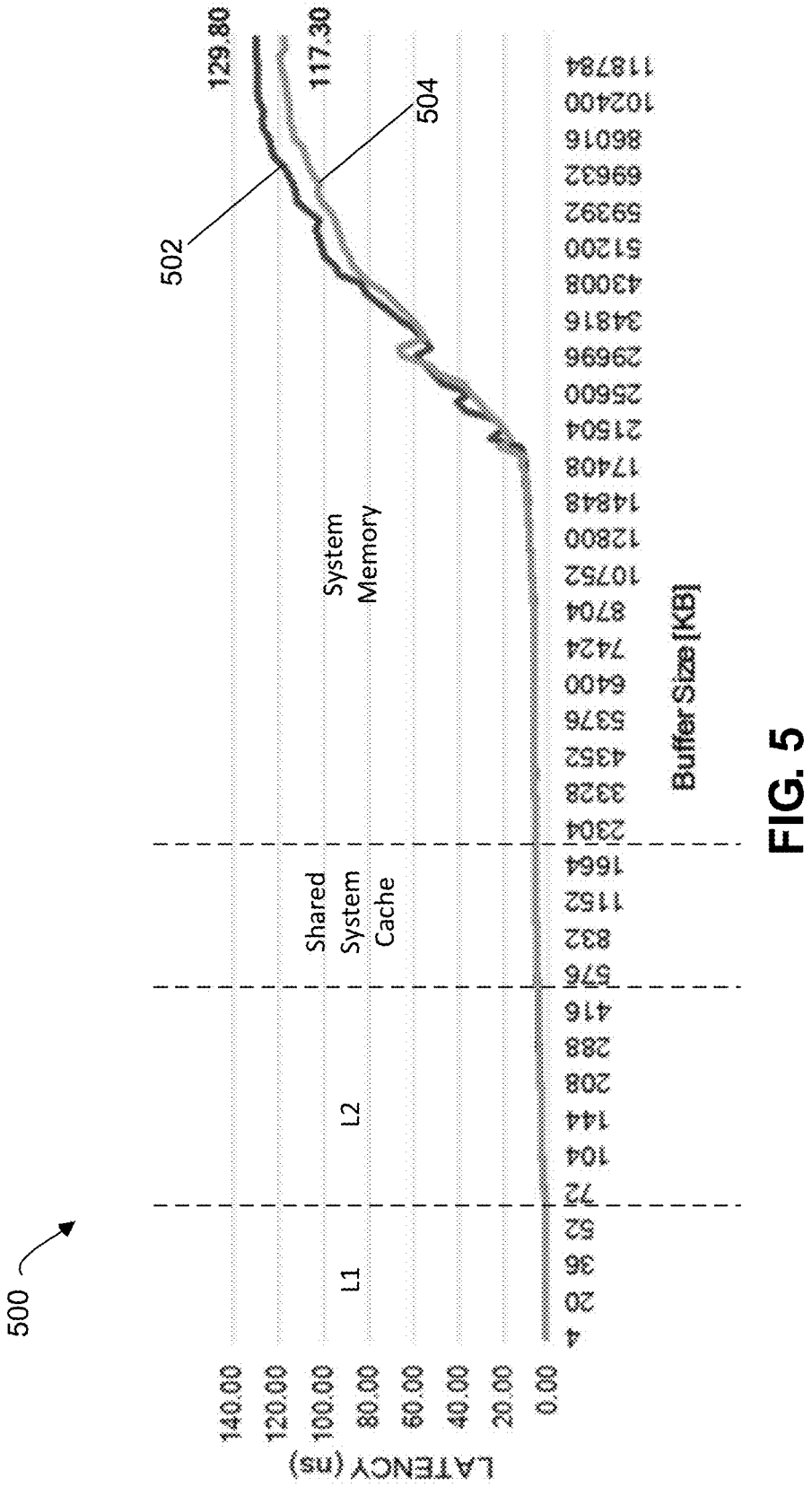
FIG. 5 is a chart comparing the memory request latency to system memory when processing a workload as shown in the third example of FIG. 4 with and without dynamically reconfiguring micro-architectural features of a processing unit, and in response to a workload being processed by the processing unit.

FIG. 5 is a chart 500 comparing the memory request latency to system memory 120 when processing the workload as shown in the third example in row 416 of FIG. 4 with and without dynamically reconfiguring micro-architectural features of a processing unit, and in response to the workload being processed by the processing unit. In this example, cache memory system 110 has the following sizes; 64K bytes (KB) for an internal L1 cache of a processing unit, 512KB for a shared L2 cache such as shared L2 cache 106S(0), and 2 MB for shared system cache memory 108. The X-axis is a varying buffer size used in the workload. The Y-axis is the measured latency for addressing a memory request. The memory requests for lower buffer sizes are satisfied by L1 caches, i.e., 0-65 KB. As the buffer size increases, memory requests are satisfied first by the L2 cache, then the shared system cache memory 108, and finally the system memory 120. Latency plot 502 is the scenario where a processing unit does not dynamically reconfigure its micro-architectural feature in response to a memory intensive workload. Latency plot 504 is the scenario where processing unit 202 dynamically reconfigures its micro-architectural feature in response to the same memory intensive workload and, in accordance with, the third example shown in row 416 in FIG. 4. As shown in the two plots in chart 500, the latency plot 504 has 12.5 nanoseconds (ns) less latency at the highest buffer sizes translating to over a 4% performance increase.

Figure 6:
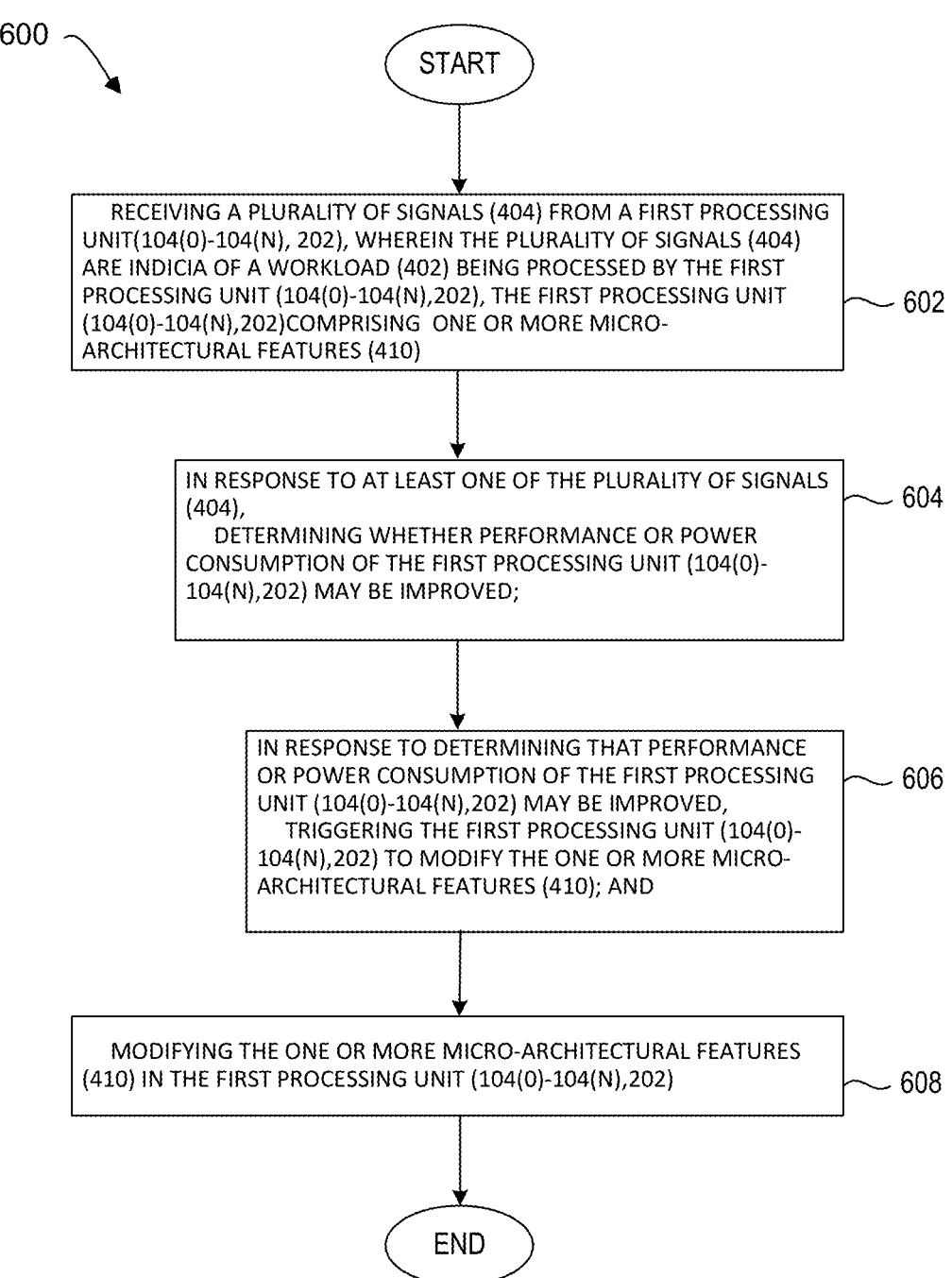
FIG. 6 is a flowchart illustrating an exemplary process for dynamically reconfiguring micro-architectural features of one or more multiple PUs in response to a workload being processed on a respective processing unit.

FIG. 6 is a flowchart illustrating an exemplary process 600 for dynamically reconfiguring micro-architectural features of one or more multiple PUs in response to a workload being processed on a respective processing unit. In this regard, a first exemplary step in the process 600 of FIG. 6 can include receiving a plurality of signals 404 from a first processing unit 104(0)-104(N), 202, wherein the plurality of signals 404 are indicia of a workload 402 being processed by the first processing unit 104(0)-104(N), 202, the first processing unit 104(0)-104(N), 202 comprising one or more micro-architectural features 410 (block 602 in FIG. 6). One means for receiving the plurality of signals includes receiving signals (also known as messages) over interconnect bus 112 while another means for receiving the plurality of signals is through posting a signal/message to the cache memory system 110. A next step in the process 600 can include in response to at least one of the plurality of signals 404, determining whether performance or power consumption of the first processing unit 104(0)-104(N), 202 may be improved (block 604 in FIG. 6). A next step in the process 600 can include in response to determining that performance or power consumption of the first processing unit 104(0)-104(N), 202 may be improved, triggering the first processing unit 104(0)-104(N), 202 to modify the one or more micro-architectural features 410 (block 606 in FIG. 6). A next step in the process 600 can include modifying the one or more micro-architectural features 410 in the first processing unit 104(0)-104(N), 202 (block 608 in FIG. 6). One means for modifying the one or more micro-architectural features 410 includes setting parameters associated with the one or more micro-architectural features to values communicated by the PUCU such as the parameter settings discussed in connection with FIG. 4.

Electronic devices that include a processor-based system that includes multiple processing units (PUs) and a memory system that includes a cache memory system including a hierarchy of local and shared cache memories and a system memory, and wherein the processor-based system includes a PUCU to dynamically reconfigure micro-architectural features of one or more of the multiple PUs in response to a workload being processed on a respective processing unit, including, but not limited to, the processor-based system 100, PUs 104(0)-104(N), 202, and PUCU 114 in FIGS. 1 and 2 and according to, but not limited to, any of the exemplary processes 300, 302, and 600 in FIGS. 3A, 3B, and 6, and according to any aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 7:
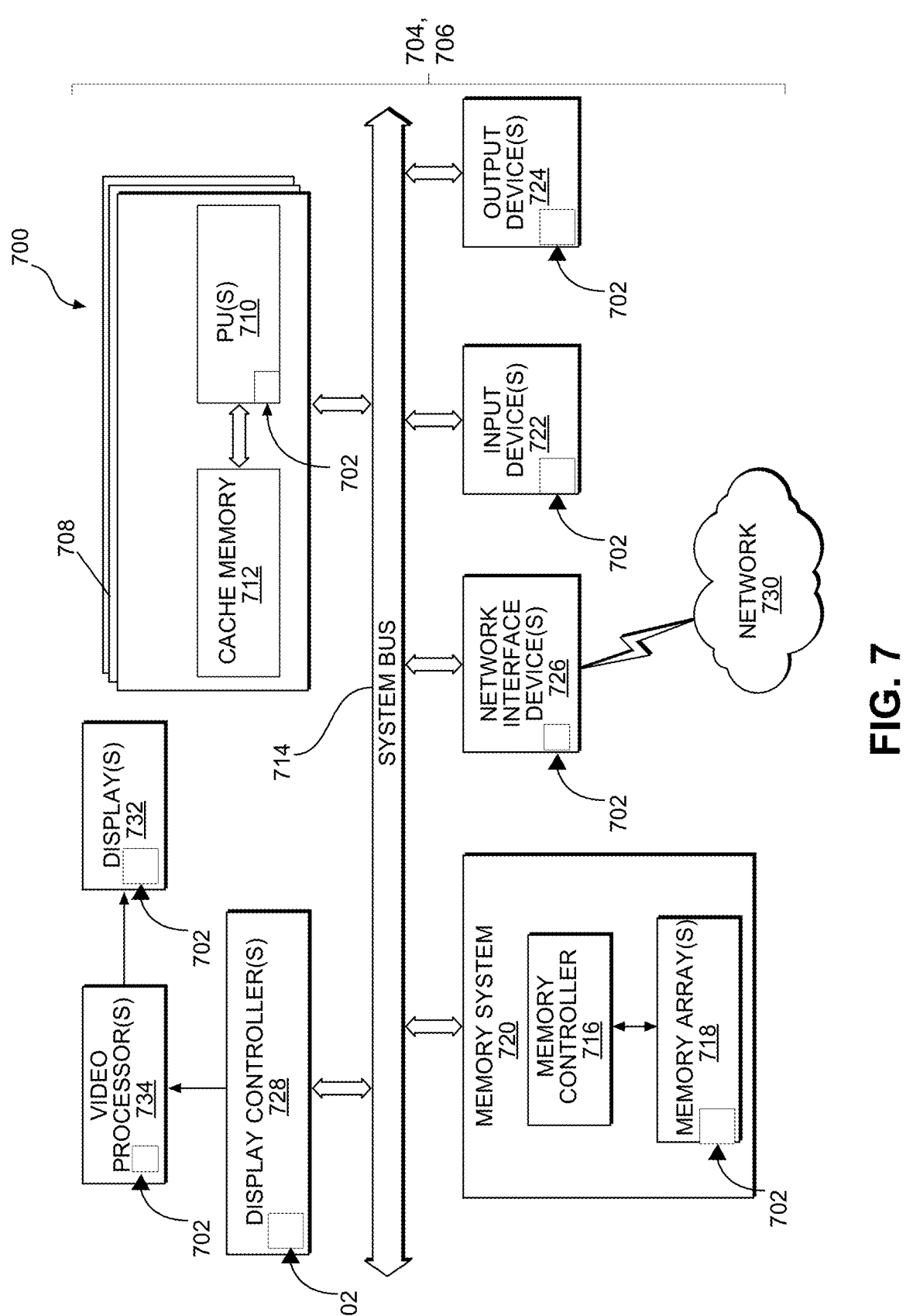
FIG. 7 is a block diagram of an exemplary processor-based system that can include multiple PUs and a PUCU to dynamically reconfigure micro-architectural features of one or more of the multiple PUs in response to a workload being processed on a respective processing unit including, but not limited to, the processing unit illustrated in FIGS. 1 and 2 and the PUCU illustrated in FIGS. 1 and 3B and according to, but not limited to, the exemplary process in FIG. 5.

In this regard, FIG. 7 illustrates an example of a processor-based system that includes multiple processing units (PUs) and a memory system that includes a cache memory system including a hierarchy of local and shared cache memories and a system memory, and wherein the processor-based system includes a PUCU to dynamically reconfigure micro-architectural features of one or more of the multiple PUs in response to a workload being processed on a respective processing unit, including, but not limited to, the processor-based system 100, PUs 104(0)-104(N), 202, and PUCU 114 in FIGS. 1 and 2 and according to, but not limited to, any of the exemplary processes 300, 302, and 600 in FIGS. 3A, 3B, and 6, and according to any aspects disclosed herein, that may be provided in or integrated into any processor-based device. In this example, the processor-based system 700 may be formed as an IC 704 and includes a PUCU 702 and may be deployed as a system-on-a-chip (SoC) 706. The processor-based system 700 may include one or more processors 708 which include a PU 710, which may also be referred to as PU or central processing unit (CPU) cores or processor cores. The PU 710 may have cache memory 712 coupled to the PU 710 for rapid access to temporarily stored data. The PU 710 is coupled to a system bus 714 and can intercouple server and client devices included in the processor-based system 700. As is well known, the PU 710 communicates with these other devices by exchanging address, control, and data information over the system bus 714. For example, the PU 710 can communicate bus transaction requests to a memory controller 716, as an example of a client device. Although not illustrated in FIG. 7, multiple system buses 714 could be provided, wherein each system bus 714 constitutes a different fabric.

Other server and client devices can be connected to the system bus 714. As illustrated in FIG. 7, these devices can include a memory system 720 that includes the memory controller 716 and a memory array(s) 718, one or more input devices 722, one or more output devices 724, one or more network interface devices 726, and one or more display controllers 728, as examples. The input device(s) 722 can include any type of input device, including, but not limited to, input keys, switches, voice processors, etc. The output device(s) 724 can include any type of output device, including, but not limited to, audio, video, other visual indicators, etc. The network interface device(s) 726 can be any device configured to allow exchange of data to and from a network 730. The network 730 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 726 can be configured to support any type of communications protocol desired.

The PU 710 may also be configured to access the display controller(s) 728 over the system bus 714 to control information sent to one or more displays 732. The display controller(s) 728 sends information to the display(s) 732 to be displayed via one or more video processor(s) 734, which process the information to be displayed into a format suitable for the display(s) 732. The display(s) 732 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium wherein any such instructions are executed by a processor or other processing device, or combinations of both. The devices and components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

Implementation examples are described in the following numbered clauses:

1. A processor-based system for dynamically reconfiguring micro-architectural features, comprising:
   a first processing unit, the first processing unit comprising one or more micro-architectural features; and
   a processing unit control unit configured to:
      receive a plurality of signals from the first processing unit, wherein the plurality of signals are indicia of a workload being processed by the first processing unit; and
      in response to at least one of the plurality of signals:
         determine whether performance or power consumption of the first processing unit may be improved; and
         in response to determining that the performance or the power consumption of the first processing unit may be improved:
            trigger the first processing unit to modify the one or more micro-architectural features,
   the first processing unit, in response to being triggered by the processing unit control unit, configured to:
   modify the one or more micro-architectural features.

2. The processor-based system of clause 1, wherein the first processing unit is one of a plurality of processing units, the processing unit control unit configured to:
   receive the plurality of signals from the plurality of processing units; and
   in response to at least one of the plurality of signals:
      determine whether performance or power consumption of one of the plurality of processing units may be improved, the one of the plurality of processing units comprising second one or more micro-architectural features; and
      in response to determining that the performance or the power consumption of the one of the plurality of processing units may be improved:
         trigger the one of the plurality of processing units to modify the second one or more micro-architectural features.

3. The processor-based system of clause 1 or 2, wherein the first processing unit is configured to modify the one or more micro-architectural features, further being configured to:
   lower the power consumption of the first processing unit for the workload being processed by the first processing unit.

4. The processor-based system of clause 1 or 2, wherein the first processing unit is configured to modify the one or more micro-architectural features, further being configured to:
   increase the performance of the workload being processed by the first processing unit.

5. The processor-based system of any of clauses 1-4, wherein the plurality of signals indicate a performance characteristic of the first processing unit.

6. The processor-based system of clause 5, wherein the plurality of signals also comprise a characteristic of an application running on the first processing unit.

7. The processor-based system of any of clauses 1-6, further comprising:
   system memory,
   wherein the indicia of the workload includes an indication of an application launch and
   wherein the processing unit control unit configured to, in response to at least one of the plurality of signals, trigger the first processing unit to modify the one or more micro-architectural features is further configured to:
      trigger the first processing unit to set a prefetch mode to an aggressive mode for the first processing unit; and
      trigger the first processing unit to set an enable prefetch target mode to direct memory requests for the first processing unit to the system memory.

8. The processor-based system of any of clauses 1-6, wherein:
   the indicia of the workload includes an indication of a streaming application launch; and
   the processing unit control unit configured to, in response to at least one of the plurality of signals, trigger the first processing unit to modify the one or more micro-architectural features is further configured to:
      trigger the first processing unit to set a prefetch mode to a conservative mode.

9. The processor-based system of any of clauses 1-6, wherein:
   the indicia of the workload includes an indication of a memory intensive workload; and
   the processing unit control unit configured to, in response to at least one of the plurality of signals, trigger the first processing unit to modify the one or more micro-architectural features is further configured to:
      trigger the first processing unit to set an enable prefetch mode to an aggressive mode for the first processing unit;
      trigger the first processing unit to set L2 caches ways for data to a maximum; and
      trigger the first processing unit to set an enable prefetch target mode to direct memory requests for the first processing unit to system memory.

10. The processor-based system of any of clauses 1-9 integrated into an integrated circuit (IC).

11. The processor-based system of any of clauses 1-10 integrated into a device selected from a group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics systems; and a multicopter.

12. A method for dynamically reconfiguring micro-architectural features, comprising:
   receiving a plurality of signals from a first processing unit, wherein the plurality of signals are indicia of a workload being processed by the first processing unit, the first processing unit comprising one or more micro-architectural features;
   in response to at least one of the plurality of signals:
      determining whether performance or power consumption of the first processing unit may be improved;

17 in response to determining that the performance or the power consumption of the first processing unit may be improved:

triggering the first processing unit to modify the one or more micro-architectural features; and modifying the one or more micro-architectural features in the first processing unit.

13. The method of clause 12, wherein modifying the one or more micro-architectural features in the first processing unit further comprises:

lowering the power consumption of the first processing unit for the workload being processed by the first processing unit.

14. The method of clause 12, wherein modifying the one or more micro-architectural features in the first processing unit, further comprises:

increasing the performance of the workload being processed by the first processing unit.

15. The method of any of clauses 12-14, wherein the plurality of signals indicate a performance characteristic of the first processing unit.

16. The method of any of clauses 12-15, wherein the plurality of signals further comprises a characteristic of an application running on the first processing unit.

17. The method of any of clauses 12-16, wherein triggering the first processing unit to modify the one or more micro-architectural features further comprises:

triggering the first processing unit to set a prefetch mode to an aggressive mode for the first processing unit; and triggering the first processing unit to set an enable prefetch target mode to direct memory requests for the first processing unit to system memory.

18. The method of any of clauses 12-16, wherein triggering the first processing unit to modify the one or more micro-architectural features further comprises:

triggering the first processing unit to set a prefetch mode to a conservative mode.

19. The method of any of clauses 12-16, wherein triggering the first processing unit to modify the one or more micro-architectural features further comprises:

triggering the first processing unit to set an enable prefetch mode to an aggressive mode for the first processing unit;

triggering the first processing unit to set L2 caches ways for data to a maximum; and triggering the first processing unit to set an enable prefetch target mode to direct memory requests for the first processing unit to system memory.

20. A processor-based system for dynamically reconfiguring micro-architectural features, comprising:

means for receiving a plurality of signals from a first processing unit, wherein the plurality of signals are indicia of a workload being processed by the first processing unit, the first processing unit comprising one or more micro-architectural features;

in response to at least one of the plurality of signals:

means for determining whether performance or power consumption of the first processing unit may be improved; and in response to determining that the performance or the power consumption of the first processing unit may be improved:

means for triggering the first processing unit to modify the one or more micro-architectural features; and

means for modifying the one or more micro-architectural features in the first processing unit.

What is claimed is:

1. A processor-based system for dynamically reconfiguring micro-architectural features, comprising:

a first processing unit, the first processing unit comprising one or more micro-architectural features; and a processing unit control unit configured to:

receive a plurality of signals from the first processing unit, wherein the plurality of signals are indicia of a workload being processed by the first processing unit; and in response to at least one of the plurality of signals:

determine whether performance or power consumption of the first processing unit may be improved; and in response to determining that the performance or the power consumption of the first processing unit may be improved:

trigger the first processing unit to modify the one or more micro-architectural features, the first processing unit, in response to being triggered by the processing unit control unit, configured to:

modify the one or more micro-architectural features, wherein:

the indicia of the workload includes an indication of a streaming application launch; and the processing unit control unit configured to, in response to at least one of the plurality of signals, trigger the first processing unit to modify the one or more micro-architectural features is further configured to:

trigger the first processing unit to set a prefetch mode to a conservative mode.

2. The processor-based system of claim 1, wherein the first processing unit is one of a plurality of processing units, the processing unit control unit configured to:

receive the plurality of signals from the plurality of processing units; and in response to at least one of the plurality of signals:

determine whether performance or power consumption of one of the plurality of processing units may be improved, the one of the plurality of processing units comprising second one or more micro-architectural features; and in response to determining that the performance or the power consumption of the one of the plurality of processing units may be improved:

trigger the one of the plurality of processing units to modify the second one or more micro-architectural features.

3. The processor-based system of claim 1, wherein the first processing unit is configured to modify the one or more micro-architectural features, further being configured to:

lower the power consumption of the first processing unit for the workload being processed by the first processing unit.

4. The processor-based system of claim 1, wherein the first processing unit is configured to modify the one or more micro-architectural features, further being configured to:

increase the performance of the workload being processed by the first processing unit.

5. The processor-based system of claim 1, wherein the plurality of signals indicate a performance characteristic of the first processing unit.

6. The processor-based system of claim 5, wherein the plurality of signals also comprise a characteristic of an application running on the first processing unit.

7. The processor-based system of claim 1, further comprising:

system memory, wherein the indicia of the workload includes an indication of an application launch and wherein the processing unit control unit configured to, in response to at least one of the plurality of signals, trigger the first processing unit to modify the one or more micro-architectural features is further configured to:

trigger the first processing unit to set a prefetch mode to an aggressive mode for the first processing unit; and trigger the first processing unit to set an enable prefetch target mode to direct memory requests for the first processing unit to the system memory.

8. The processor-based system of claim 1, wherein:

the indicia of the workload includes an indication of a memory intensive workload; and the processing unit control unit configured to, in response to at least one of the plurality of signals, trigger the first processing unit to modify the one or more micro-architectural features is further configured to:

trigger the first processing unit to set an enable prefetch mode to an aggressive mode for the first processing unit;

trigger the first processing unit to set L2 caches ways for data to a maximum; and trigger the first processing unit to set an enable prefetch target mode to direct memory requests for the first processing unit to system memory.

9. The processor-based system of claim 1 integrated into an integrated circuit (IC).

10. The processor-based system of claim 1 integrated into a device selected from a group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics systems; and a multicopter.

11. A method for dynamically reconfiguring micro-architectural features, comprising:

receiving a plurality of signals from a first processing unit, wherein the plurality of signals are indicia of a work-load being processed by the first processing unit, the first processing unit comprising one or more micro-architectural features;

in response to at least one of the plurality of signals:

determining whether performance or power consumption of the first processing unit may be improved;

in response to determining that the performance or the power consumption of the first processing unit may be improved:

triggering the first processing unit to modify the one or more micro-architectural features; and modifying the one or more micro-architectural features in the first processing unit, wherein triggering the first processing unit to modify the one or more micro-architectural features further comprises:

triggering the first processing unit to set a prefetch mode to a conservative mode.

12. The method of claim 11, wherein modifying the one or more micro-architectural features in the first processing unit further comprises:

lowering the power consumption of the first processing unit for the workload being processed by the first processing unit.

13. The method of claim 11, wherein modifying the one or more micro-architectural features in the first processing unit, further comprises:

increasing the performance of the workload being processed by the first processing unit.

14. The method of claim 11, wherein the plurality of signals indicate a performance characteristic of the first processing unit.

15. The method of claim 14, wherein the plurality of signals further comprises a characteristic of an application running on the first processing unit.

16. The method of claim 11, wherein triggering the first processing unit to modify the one or more micro-architectural features further comprises:

triggering the first processing unit to set a prefetch mode to an aggressive mode for the first processing unit; and triggering the first processing unit to set an enable prefetch target mode to direct memory requests for the first processing unit to system memory.

17. The method of claim 11, wherein triggering the first processing unit to modify the one or more micro-architectural features further comprises:

triggering the first processing unit to set an enable prefetch mode to an aggressive mode for the first processing unit;

triggering the first processing unit to set L2 caches ways for data to a maximum; and triggering the first processing unit to set an enable prefetch target mode to direct memory requests for the first processing unit to system memory.

\* \* \* \* \*